(12) United States Patent
Tang

(10) Patent No.: US 11,224,062 B2
(45) Date of Patent: Jan. 11, 2022

(54) METHOD FOR CONFIGURING SCHEDULING REQUEST, NETWORK DEVICE AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 68 days.

(21) Appl. No.: 16/646,764

(22) PCT Filed: Sep. 15, 2017

(86) PCT No.: PCT/CN2017/101864
§ 371 (c)(1),
(2) Date: Mar. 12, 2020

(87) PCT Pub. No.: WO2019/051765
PCT Pub. Date: Mar. 21, 2019

(65) Prior Publication Data
US 2020/0275467 A1  Aug. 27, 2020

(51) Int. Cl.
*H04W 72/12* (2009.01)
*H04W 72/14* (2009.01)

(52) U.S. Cl.
CPC .... *H04W 72/1284* (2013.01); *H04W 72/1268* (2013.01); *H04W 72/14* (2013.01)

(58) Field of Classification Search
CPC . H04W 72/1284; H04W 8/245; H04W 72/14; H04W 82/12; H04W 72/1289;
(Continued)

(56) References Cited

U.S. PATENT DOCUMENTS

| 2014/0010182 A1* | 1/2014 | Chunli | H04L 5/0048 370/329 |
| 2016/0066328 A1* | 3/2016 | Hu | H04W 72/1242 370/329 |

(Continued)

FOREIGN PATENT DOCUMENTS

| CN | 104811892 A | 7/2015 |
| CN | 105075146 A | 11/2015 |
| CN | 107040351 A | 8/2017 |

OTHER PUBLICATIONS

Written Opinion of the International Search Authority in the international application No. PCT/CN2017/101864, dated May 30, 2018.
(Continued)

*Primary Examiner* — Danh C Le
(74) *Attorney, Agent, or Firm* — Perkins Coie LLP

(57) ABSTRACT

Disclosed are a method for configuring a scheduling request, a network device, a terminal device, and a computer storage medium. The method comprises: configuring for a terminal device configuration parameters of a scheduling request respectively corresponding to each carrier in at least one carrier, wherein the configuration parameters of at least one scheduling request are configured for the same carrier; and configuring for the terminal device a mapping relation between each logical channel in at least one logical channel and the configuration parameters of at least one scheduling request.

14 Claims, 2 Drawing Sheets

---

An SR configuration corresponding to each of at least one carrier is configured for a terminal device — 101

A mapping relationship between each of at least one LCH and the at least one SR configuration is configured for the terminal device — 102

(58) Field of Classification Search
CPC ......... H04W 72/1268; H04W 7212/94; H04M 1/72519; H04M 1/72522; H04L 29/06
USPC .................. 370/329, 310.2; 455/418, 550.1
See application file for complete search history.

(56) References Cited

U.S. PATENT DOCUMENTS

| | | | | |
|---|---|---|---|---|
| 2018/0295540 | A1* | 10/2018 | Akkarakaran | H04W 72/042 |
| 2019/0098626 | A1* | 3/2019 | Yi | H04W 72/0473 |
| 2019/0289513 | A1* | 9/2019 | Jeon | H04W 36/06 |
| 2020/0059953 | A1* | 2/2020 | Liu | H04W 72/14 |
| 2020/0137528 | A1* | 4/2020 | Ai | H04W 4/06 |
| 2020/0213066 | A1* | 7/2020 | Ma | H04W 72/04 |
| 2020/0267594 | A1* | 8/2020 | Xu | H04W 80/02 |
| 2020/0288494 | A1* | 9/2020 | Heo | H04W 72/1289 |
| 2020/0305181 | A1* | 9/2020 | Yue | H04W 72/12 |

OTHER PUBLICATIONS

First Office Action of the European application No. 17925009.7, dated Jan. 22, 2021.
ZTE. Consideration on the SR in NR. 3GPP TSG-RAN WG2 #99 R2-1708146. Aug. 25, 2017 (Aug. 25, 2017), sections 1 and 2.
Mediatek Inc. SR design for multiple numerologies. 3GPP TSG-RAN WG2 NR Ad Hoc #2 R2-1707267. Jun. 29, 2017(Jun. 29, 2017), sections 1 and 2.
Asustek. Consideration on multiple SR configurations. 3GPP TSG-RAN WG2 NR Ad Hoc #2 R2-1706932. Jun. 29, 2017(Jun. 29, 2017), entire document.
NEC. SR on PUCCH SCell. 3GPP TSG RAN WG2 Meeting #89b R2-151430. Apr. 24, 2015 (Apr. 24, 2015), entire document.
International Search Report in the international application No. PCT/CN2017/101864, dated May 30, 2018.
Vice-Chairwoman (Interdigital): "Report from NR User Plane Break-Out Session", 3GPP Draft; NR-Up-Break-Out Chair Notes—Jun. 29, 2017_18-30, 3rd Generation Partnership Project(3GPP), Mobile Competence Centre; 650, Route des Lucioles; F-06921 Sophia-Antipolis Cedex; France vol. Ran WG2, No. Quingdao, China; Jun. 27, 2017-Jun. 29, 2017 Jun. 29, 2017 (Jun. 29, 2017), XP051307576.
Intel Corporation: "Handling of multiple SR configurations", 3GPP Draft; R2-1708789 Multiple SRS, SRD Generation Partnership Project (3GPP), Mobile Competence Centre; 650, Route des Lucioles; F-06921 Sophia-Antipolis Cedex; France vol. RAN WG2, No. Berlin, Germany; Aug. 21, 2017-Aug. 25, 2017 Aug. 20, 2017(Aug. 20, 2017), XP051318593.
ZTE:"Consideration on the SR in NR", 3GPP DRAFT;R2-1706641 Consideration on the SR in NR, 3rd Generation Partnership Project (3GPP), Mobilecompetence Centre; 650, Route des Lucioles; F-06921 Sophia-Antipolis Cedex; France vol. RAN WG2, No. Qingdao, China Jun. 27, 2017-Jun. 29, 2017; Jun. 26, 2017(Jun. 26, 2017), XP051301143.
HTC: "Discussion on LCG and SR configuration", 3GPP Draft; R2-1709420, 3rd Generation PartnershipProject(3GPP), Mobile Competence Centre; 650, Route des Lucioles; F-06921 Sophia-Antipolis Cedex; France vol. RAN WG2, No. Berlin, Germany; Aug. 21, 2017-Aug. 25, 2017 Aug. 20, 2017(Aug. 20, 2017), XP051319148.
Supplementary International Search Report in the international application No. PCT/CN2017/101864, dated Dec. 4, 2019.
First Office Action of the Chinese application No. 201780091671.5, dated Jul. 2, 2021. 12 pages with English translation.
Second Office Action of the European application No. 17925009.7, dated Jul. 19, 2021. 7 pages.

* cited by examiner

METHOD FOR CONFIGURING SCHEDULING REQUEST, NETWORK DEVICE AND TERMINAL DEVICE

CROSS-REFERENCE TO RELATED APPLICATIONS

The present application is a U.S. National Phase Entry of International PCT Application No. PCT/CN2017/101864 filed on Sep. 15, 2017, and named after "METHOD FOR CONFIGURING SCHEDULING REQUEST, NETWORK DEVICE AND TERMINAL DEVICE", the content of which is hereby incorporated by reference in its entirety.

TECHNICAL FIELD

The application relates to the technical field of information processing, and particularly to a method for configuring a Scheduling Request (SR), a network device, a terminal device and a computer storage medium.

BACKGROUND

A Long Term Evolution (LTE) SR is a 1-bit message transmitted by a terminal on a Physical Uplink Control Channel (PUCCH) to request for an uplink grant resource. In LTE, a Media Access Control (MAC) entity corresponding to a terminal may be configured with one or more SR configurations. Multiple SR configurations are configured so that Secondary Cells (SCells) have corresponding SR configurations under a Carrier Aggregation (CA) condition. In New Radio (NR) discussions, it has been agreed that multiple SR configurations will be configured for a MAC entity of a terminal device. In such a scenario, there exists a problem to be solved of how to prevent multiple-carrier user equipment from failing to correctly send an SR due to a failure of the mapping relationship, when the SR is performed by the user equipment.

SUMMARY

For solving the foregoing technical problem, embodiments of the application provide a method for configuring an SR, a network device, a terminal device and a computer storage medium.

The embodiments of the application provide a method for configuring an SR, applied to a network device, the method including:

an SR configuration corresponding to each of at least one carrier is configured for a terminal device, at least one SR configuration being configured for the same carrier; and a mapping relationship between each of at least one Logical Channel (LCH) and the at least one SR configuration is configured for the terminal device.

The embodiments of the application provide a method for configuring an SR, applied to a terminal device, the method including:

an SR configuration configured by a network side and corresponding to each of at least one carrier is received, at least one SR configuration being configured for a same carrier; and a mapping relationship configured by the network side and between each of at least one LCH and the at least one SR configuration is received.

The embodiments of the application provide a network device, including:

a first configuration unit configured to configure, for a terminal device, an SR configuration corresponding to each of at least one carrier, at least one SR configuration being configured for a same carrier; and a second configuration unit configured to configure, for the terminal device, a mapping relationship between each of at least one LCH and the at least one SR configuration.

The embodiments of the application provide a terminal device, including:

a first processing unit configured to receive an SR configuration configured by a network side and corresponding to each of at least one carrier, at least one SR configuration being configured for a same carrier; and a second processing unit configured to receive a mapping relationship configured by the network side and between each of at least one LCH and the at least one SR configuration.

The embodiments of the application provide a network device, including a processor and a memory configured to store a computer program capable of running on the processor.

Herein, the processor may be configured to, when the computer program is running on the processor, execute the steps of the abovementioned method.

The embodiments of the application provide a terminal device, including a processor and a memory configured to store a computer program capable of running on the processor.

Herein, the processor may be configured to, when the computer program is running on the processor, execute the steps of the abovementioned method.

The embodiments of the application provide a computer storage medium having stored thereon computer-executable instructions that, when executed, implement the steps of the abovementioned method.

According to the technical solutions of the embodiments of the application, the SR configurations configured for the terminal device by a network and corresponding to different carriers may be received, and the SR configurations are mapped to the LCHs. In such a manner, the terminal device may be ensured to acquire correspondences among the LCHs, the carriers and the SR configurations, so that a corresponding resource may be timely determined during scheduling requesting, and system processing efficiency is improved.

DETAILED DESCRIPTION

In order to make the characteristics and technical contents of the embodiments of the application understood in more detail, implementation of the embodiments of the application will be described below in combination with the drawings in detail. The drawings are only adopted for description as references and not intended to limit the embodiments of the application.

First Embodiment

Figure 1:
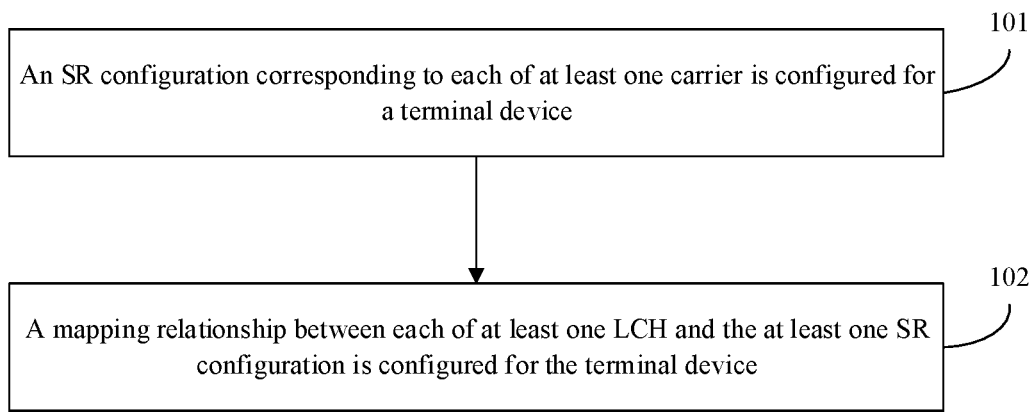
FIG. 1 is a first flowchart of a method for configuring an SR according to an embodiment of the application.

The embodiment of the application provides a method for configuring an SR, which is applied to a network device and, as shown in FIG. 1, includes the following operations 101 to 102.

In 101, an SR configuration corresponding to each of at least one carrier respectively is configured for a terminal device, at least one SR configuration being configured for the same carrier.

In 102, a mapping relationship between each of at least one LCH and the at least one SR configuration is configured for the terminal device.

The embodiment may particularly be applied to a CA scenario, and under the condition of multiple carriers, multiple carriers may be configured for the same terminal device.

If the terminal device aggregates two carriers, i.e., a carrier 1 and a carrier 2, the carrier 1 may be considered as a Primary Cell (PCell), and the carrier 2 may be considered as an SCell.

In addition, the terminal device provided in the embodiment may be a terminal device supporting multiple LCHs. For example, a terminal device may support four LCHs which may be designated as {LCH1, LCH2, LCH3, LCH4} respectively.

Two manners in which the network side configures at least one SR configuration for the terminal device will be described below respectively.

A First Manner operation that the SR configuration corresponding to each of the at least one carrier is configured for the terminal device may include that: different SR configurations are configured for different carriers, different SR configurations with the same SR configuration period being configured for different carriers.

That is, different SR configurations are configured for different carriers respectively. Descriptions are made still with a scenario with two carriers as an example. For example, for the carrier 1, two corresponding SR configurations are SR-CONFIG-1-A and SR-CONFIG-1-B respectively; and for the carrier 2, two corresponding SR configurations are SR-CONFIG-2-A and SR-CONFIG-2-B respectively. There is made such a hypothesis that SR-CONFIG-1-A and the SR-CONFIG-2-A have the same SR configuration period and, similarly, SR-CONFIG-1-B and SR-CONFIG-2-B have the same SR configuration period, as shown in Table 1.

TABLE 1

| Carrier1 | SR-CONFIG-1-A | SR-CONFIG-1-B |
| Carrier2 | SR-CONFIG-2-A | SR-CONFIG-2-B |

Correspondingly, in this manner, a method for configuring the mapping relationship between the LCH and the SR configuration includes the following operations.

The SR configurations corresponding to different carriers are selected for each LCH.

A mapping relationship between each LCH and the selected SR configurations corresponding to different carriers is established.

Specifically, SR configurations with a same SR configuration period are selected for each LCH from among the different SR configurations configured for different carriers.

That is, during LCH mapping, the SR configurations with the same configuration period and corresponding to one or more carriers are configured for the same LCH.

For example, according to a first mapping manner between SR configurations and carriers, the network maps two SR configurations corresponding to different carriers respectively to each LCH, as shown in Table 2.

TABLE 2

| LCH1 | SR-CONFIG-1-A; SR-CONFIG-2-A |
| LCH2 | SR-CONFIG-1-B; SR-CONFIG-2-B |
| LCH3 | SR-CONFIG-1-A; SR-CONFIG-2-A |
| LCH4 | SR-CONFIG-1-B; SR-CONFIG-2-B |

A second manner: the difference with the first manner is that, in this manner, it is unnecessary to set so many SR configurations, and only through relatively few SR configurations, different carriers are configured and multiple LCHs are mapped. Specific processing is as follows.

The operation that the SR configuration corresponding to each of the at least one carrier is configured for the terminal device may include the following operation.

The same SR configuration is configured for different carriers of the at least one carrier.

In this scenario, at least one PUCCH resource for different carriers may be set in each SR configuration. Moreover, different SR configurations may have different SR periods.

Specifically, the same SR configuration is configured for different carriers respectively. For example, there are totally two SR configurations: {SR-CONFIG-1, SR-CONFIG-2}.

For example, a PUCCH resource corresponding to SR-CONFIG-1 is located on the carrier 1 and the carrier 2 respectively, and a PUCCH resource corresponding to SR-CONFIG-2 is located on the carrier 1 and the carrier 2 respectively. SR-CONFIG-1 and SR-CONFIG-2 have different SR periods.

Correspondingly, the operation that the mapping relationship between each of the at least one LCH and the at least one SR configuration is configured for the terminal device may include the following operation.

An SR configuration is mapped to each LCH, the SR configuration including a PUCCH resource for the at least one carrier.

The network configures mapping between the LCH and the SR configuration. The following mapping relationship between the LCH and the SR configuration may be formed respectively based on a mapping relationship between different SR configurations and carriers: the network maps one SR configuration to each LCH, said one SR configuration including PUCCH resources of two carriers, as shown in Table 3.

TABLE 3

| LCH1 | SR-CONFIG-1 |
| LCH2 | SR-CONFIG-2 |
| LCH3 | SR-CONFIG-1 |
| LCH4 | SR-CONFIG-2 |

Thus it can be seen that, with adoption of the solution, the SR configurations configured for the terminal device by a network and corresponding to different carriers may be received, and the SR configurations are mapped to the LCHs. In such a manner, the terminal device may be ensured to acquire correspondences among the LCHs, the carriers and the SR configurations, so that a corresponding resource may be timely determined during scheduling requesting, and system processing efficiency is improved.

Second Embodiment

Figure 2:
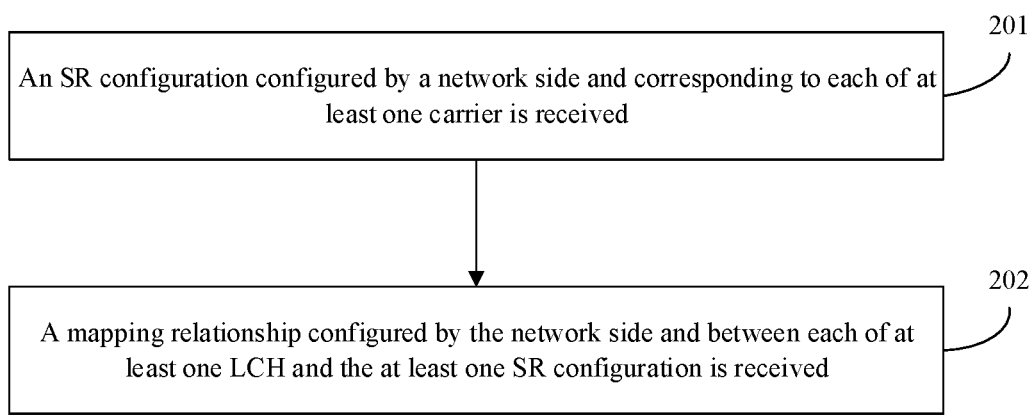
FIG. 2 is a second flowchart of a method for configuring an SR according to an embodiment of the application.

The embodiment of the application provides a method for configuring an SR, which is applied to a terminal device and, as shown in FIG. 2, includes the following operations 201 to 202.

In 201, an SR configuration configured by a network side and corresponding to each of at least one carrier is received, at least one SR configuration being configured for the same carrier.

In 202, a mapping relationship configured by the network side and between each of at least one LCH and the at least one SR configuration is received.

The embodiment may particularly be applied to a CA scenario, and under the condition of multiple carriers, multiple carriers may be configured for the same terminal device.

If the terminal device aggregates two carriers, i.e., a carrier 1 and a carrier 2, the carrier 1 may be considered as a PCell, and the carrier 2 may be considered as an SCell.

In addition, the terminal device provided in the embodiment may be a terminal device supporting multiple LCHs. For example, a terminal device may support four LCHs which may be designated as {LCH1, LCH2, LCH3, LCH4} respectively.

Two manners in which the network side configures at least one SR configuration for the terminal device will be described below respectively.

A First Manner

The operation that the SR configuration, configured by the network side, corresponding to each of the at least one carrier is received may include the following operation.

Different SR configurations configured for different carriers by the network side are received, different SR configurations with the same SR configuration period being configured for different carriers.

That is, different SR configurations are configured for different carriers respectively. Descriptions are made still with a scenario with two carriers as an example. For example, for the carrier 1, two corresponding SR configurations are SR-CONFIG-1-A and SR-CONFIG-1-B respectively; and for the carrier 2, two corresponding SR configurations are SR-CONFIG-2-A and SR-CONFIG-2-B respectively. There is made such a hypothesis that SR-CONFIG-1-A and the SR-CONFIG-2-A have the same SR configuration period and, similarly, SR-CONFIG-1-B and SR-CONFIG-2-B have the same SR configuration period, as shown in Table 1.

TABLE 1

| Carrier1 | SR-CONFIG-1-A | SR-CONFIG-1-B |
|----------|---------------|---------------|
| Carrier2 | SR-CONFIG-2-A | SR-CONFIG-2-B |

Correspondingly, in this manner, the operation that the mapping relationship configured by the network side and between each of the at least one LCH and the at least one SR configuration is received may include the following operation.

A mapping relationship configured by the network side and between each LCH and the SR configurations corresponding to different carriers is received.

Herein, each LCH is mapped to the SR configurations with the same SR configuration period, which are configured for different carriers.

That is, during LCH mapping, the SR configurations with the same configuration period and corresponding to one or more carriers are configured for the same LCH.

For example, according to a first mapping manner between SR configurations and carriers, the network maps two SR configurations corresponding to different carriers respectively to each LCH, as shown in Table 2.

TABLE 2

| LCH1 | SR-CONFIG-1-A; SR-CONFIG-2-A |
| LCH2 | SR-CONFIG-1-B; SR-CONFIG-2-B |
| LCH3 | SR-CONFIG-1-A; SR-CONFIG-2-A |
| LCH4 | SR-CONFIG-1-B; SR-CONFIG-2-B |

A second manner: the difference with the first manner is that, in this manner, it is unnecessary to set so many SR configurations, and only through relatively few SR configurations, different carriers are configured and multiple LCHs are mapped. Specific processing is as follows.

The operation that the SR configuration, configured by the network side, corresponding to each of the at least one carrier is received may include the following operation.

A same SR configuration configured by the network side for different carriers of the at least one carrier is received.

In this scenario, at least one PUCCH resource for different carriers may be set in each SR configuration. Moreover, different SR configurations may have different SR periods.

Specifically, the same SR configuration is configured for different carriers respectively. For example, there are totally two SR configurations: {SR-CONFIG-1, SR-CONFIG-2}.

For example, a PUCCH resource corresponding to SR-CONFIG-1 is located on the carrier 1 and the carrier 2 respectively, and a PUCCH resource corresponding SR-CONFIG-2 is located on the carrier 1 and the carrier 2 respectively. SR-CONFIG-1 and SR-CONFIG-2 have different SR periods.

Correspondingly, the operation that the mapping relationship configured by the network side and between each of the at least one LCH and the at least one SR configuration is received may include the following operation.

The SR configuration configured for each LCH by the network side is received, the SR configuration including a PUCCH resource for the at least one carrier.

The network configures mapping between the LCH and the SR configuration. The following mapping relationship between the LCH and the SR configuration may be formed respectively based on a mapping relationship between different SR configurations and carriers: the network maps one SR configuration to each LCH, said one SR configuration including PUCCH resources of two carriers, as shown in Table 3.

TABLE 3

| LCH1 | SR-CONFIG-1 |
| LCH2 | SR-CONFIG-2 |
| LCH3 | SR-CONFIG-1 |
| LCH4 | SR-CONFIG-2 |

In the scenario provided in the embodiment, reporting of the SR may further be performed on a terminal device side based on a configuration condition of the network side. No matter which manner is adopted, the following processing manner is adopted when the terminal device reports the SR.

When the terminal device reports the SR, an LCH on which reporting of the SR is triggered is acquired.

The at least one SR configuration corresponding to the LCH is acquired.

A PUCCH resource nearest to a moment when reporting of the SR is triggered is selected based on a PUCCH resource corresponding to the at least one SR configuration, and an SR is transmitted on the selected PUCCH resource.

Specifically, the terminal device selects the corresponding SR configuration according to the LCH on which reporting of the SR is triggered. For example, if the reporting of the SR is triggered on an LCH1, selection is performed as follows.

For the first manner: an SR corresponding to SR-CONFIG-1-A and SR-CONFIG-2-A may be selected to be selected.

For the second manner: an SR corresponding SR-CONFIG-1 may be selected to be reported.

For the two methods, the terminal device selects a PUCCH resource nearest to a moment when reporting of the SR is triggered to transmit the SR.

Thus it can be seen that, with adoption of the solution, the SR configurations configured for the terminal device by a network and corresponding to different carriers may be received, and the SR configurations are mapped to the LCHs. In such a manner, the terminal device may be ensured to acquire correspondences among the LCHs, the carriers and the SR configurations, so that a corresponding resource may be timely determined during scheduling requesting, and system processing efficiency is improved.

Third Embodiment

Figure 3:
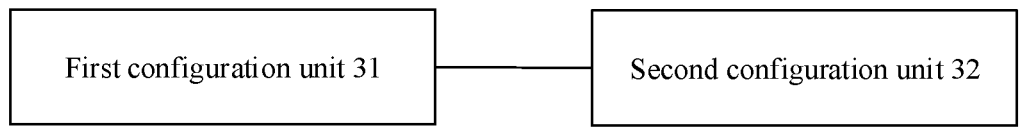
FIG. 3 is a composition structure diagram of a network device according to an embodiment of the application.

The embodiment of the application provides a network device, which, as shown in FIG. 3, includes a first configuration unit 31 and a second configuration unit 32.

The first configuration unit 31 is configured to configure, for a terminal device, an SR configuration corresponding to each of at least one carrier, at least one SR configuration being configured for the same carrier.

The second configuration unit 32 is configured to configure, for the terminal device, a mapping relationship between each of at least one LCH and the at least one SR configuration.

The embodiment may particularly be applied to a CA scenario, and under the condition of multiple carriers, multiple carriers may be configured for the same terminal device.

If the terminal device aggregates two carriers, i.e., a carrier 1 and a carrier 2, the carrier 1 may be considered as a PCell, and the carrier 2 may be considered as an SCell.

In addition, the terminal device provided in the embodiment may be a terminal device supporting multiple LCHs. For example, a terminal device may support four LCHs which may be designated as {LCH1, LCH2, LCH3, LCH4} respectively.

Two manners in which the network side configures at least one SR configuration for the terminal device will be described below respectively.

A First Manner

The first configuration unit is configured to configure different SR configurations for different carriers, different SR configurations with the same SR configuration period being configured for different carriers.

That is, different SR configurations are configured for different carriers respectively. Descriptions are made still with a scenario with two carriers as an example. For example, for the carrier 1, two corresponding SR configurations are SR-CONFIG-1-A and SR-CONFIG-1-B respectively; and for the carrier 2, two corresponding SR configurations are SR-CONFIG-2-A and SR-CONFIG-2-B respectively. There is made such a hypothesis that SR-CONFIG-1-A and the SR-CONFIG-2-A have the same SR configuration period and, similarly, SR-CONFIG-1-B and SR-CONFIG-2-B have the same SR configuration period, as shown in Table 1.

TABLE 1

| Carrier1 | SR-CONFIG-1-A | SR-CONFIG-1-B |
| Carrier2 | SR-CONFIG-2-A | SR-CONFIG-2-B |

Correspondingly, in this manner, a method for configuring the mapping relationship between the LCH and the SR configuration includes the following operations.

The second configuration unit is configured to select, for each LCH, SR configurations corresponding to different carriers and establish a mapping relationship between each LCH and the selected SR configurations corresponding to different carriers.

The second configuration unit is configured to select, for each LCH, SR configurations with a same SR configuration period from among the different SR configurations configured for different carriers.

That is, during LCH mapping, the SR configurations with the same configuration period and corresponding to one or more carriers are configured for the same LCH.

For example, according to a first mapping manner between SR configurations and carriers, the network maps two SR configurations corresponding to different carriers respectively to each LCH, as shown in Table 2.

TABLE 2

| LCH1 | SR-CONFIG-1-A; SR-CONFIG-2-A |
| LCH2 | SR-CONFIG-1-B; SR-CONFIG-2-B |
| LCH3 | SR-CONFIG-1-A; SR-CONFIG-2-A |
| LCH4 | SR-CONFIG-1-B; SR-CONFIG-2-B |

A second manner: the difference with the first manner is that, in this manner, it is unnecessary to set so many SR configurations, and only through relatively few SR configurations, different carriers are configured and multiple LCHs are mapped. Specific processing is as follows.

The first configuration unit is configured to configure the same SR configuration for different carriers of the at least one carrier.

In this scenario, at least one PUCCH resource for different carriers may be set in each SR configuration. Moreover, different SR configurations may have different SR periods.

Specifically, the same SR configuration is configured for different carriers respectively. For example, there are totally two SR configurations: {SR-CONFIG-1, SR-CONFIG-2}.

For example, a PUCCH resource corresponding to SR-CONFIG-1 is located on the carrier 1 and the carrier 2 respectively, and a PUCCH resource corresponding to SR-CONFIG-2 is located on the carrier 1 and the carrier 2 respectively. SR-CONFIG-1 and SR-CONFIG-2 have different SR periods.

Correspondingly, the second configuration unit is configured to map one SR configuration to each LCH, said one SR configuration including a PUCCH resource for the at least one carrier.

The network configures mapping between the LCH and the SR configuration. The following mapping relationship between the LCH and the SR configuration may be formed respectively based on a mapping relationship between different SR configurations and carriers: the network maps one SR configuration to each LCH, said one SR configuration including PUCCH resources of two carriers, as shown in Table 3.

TABLE 3

| LCH1 | SR-CONFIG-1 |
|------|-------------|
| LCH2 | SR-CONFIG-2 |
| LCH3 | SR-CONFIG-1 |
| LCH4 | SR-CONFIG-2 |

Thus it can be seen that, with adoption of the solution, the SR configurations configured for the terminal device by a network and corresponding to different carriers may be received, and the SR configurations are mapped to the LCHs. In such a manner, the terminal device may be ensured to acquire correspondences among the LCHs, the carriers and the SR configurations, so that a corresponding resource may be timely determined during scheduling requesting, and system processing efficiency is improved.

Fourth Embodiment

Figure 4:
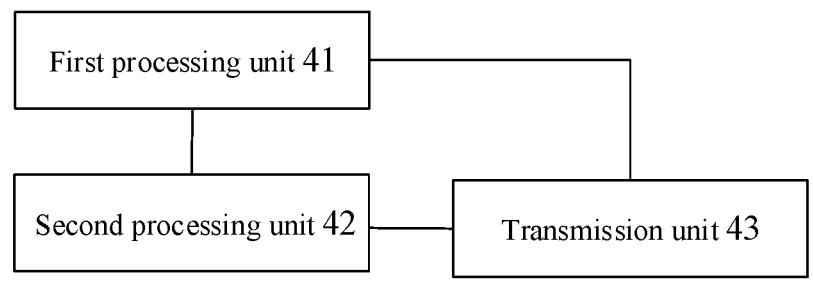
FIG. 4 is a composition structure diagram of a terminal device according to an embodiment of the application.

The embodiment of the application provides a terminal device, which, as shown in FIG. 4, includes a first processing unit 41 and a second processing unit 42.

The first processing unit 41 is configured to receive an SR configuration configured by a network side and corresponding to each of at least one carrier, at least one SR configuration being configured for the same carrier.

The second processing unit 42 is configured to receive a mapping relationship configured by the network side and between each of at least one LCH and the at least one SR configuration.

The embodiment may particularly be applied to a CA scenario, and under the condition of multiple carriers, multiple carriers may be configured for the same terminal device.

If the terminal device aggregates two carriers, i.e., a carrier and a carrier 2, the carrier 1 may be considered as a PCell, and the carrier 2 may be considered as an SCell.

In addition, the terminal device provided in the embodiment may be a terminal device supporting multiple LCHs. For example, a terminal device may support four LCHs which may be designated as {LCH1, LCH2, LCH3, LCH4} respectively.

Two manners in which the network side configures at least one SR configuration for the terminal device will be described below respectively.

A First Manner

The first processing unit is configured to receive different SR configurations configured for different carriers by the network side, different SR configurations with the same SR configuration period being configured for different carriers.

That is, different SR configurations are configured for different carriers respectively. Descriptions are made still with a scenario with two carriers as an example. For example, for the carrier 1, two corresponding SR configurations are SR-CONFIG-1-A and SR-CONFIG-1-B respectively; and for the carrier 2, two corresponding SR configurations are SR-CONFIG-2-A and SR-CONFIG-2-B respectively. There is made such a hypothesis that SR-CON-FIG-1-A and the SR-CONFIG-2-A have the same SR configuration period and, similarly, SR-CONFIG-1-B and SR-CONFIG-2-B have the same SR configuration period, as shown in Table 1.

TABLE 1

| Carrier1 | SR-CONFIG-1-A | SR-CONFIG-1-B |
| Carrier2 | SR-CONFIG-2-A | SR-CONFIG-2-B |

Correspondingly, in this manner, the second processing unit is configured to receive a mapping relationship configured by the network side and between each LCH and the SR configurations corresponding to different carriers.

Herein, each LCH is mapped to the SR configurations with the same SR configuration period, which are configured for different carriers.

That is, during LCH mapping, the SR configurations with the same configuration period and corresponding to one or more carriers are configured for the same LCH.

For example, according to a first mapping manner SR configurations and carriers, the network maps two SR configurations corresponding to different carriers respectively to each LCH, as shown in Table 2.

TABLE 2

| LCH1 | SR-CONFIG-1-A; SR-CONFIG-2-A |
| LCH2 | SR-CONFIG-1-B; SR-CONFIG-2-B |
| LCH3 | SR-CONFIG-1-A; SR-CONFIG-2-A |
| LCH4 | SR-CONFIG-1-B; SR-CONFIG-2-B |

A second manner: the difference with the first manner is that, in this manner, it is unnecessary to set so many SR configurations, and only through relatively few SR configurations, different carriers are configured and multiple LCHs are mapped. Specific processing is as follows.

The first processing unit is configured to receive the same SR configuration configured by the network side for different carriers of the at least one carrier.

In this scenario, at least one PUCCH resource for different carriers may be set in each SR configuration. Moreover, different SR configurations may have different SR periods.

Specifically, the same SR configuration is configured for different carriers respectively. For example, there are totally two SR configurations: {SR-CONFIG-1, SR-CONFIG-2}.

For example, a PUCCH resource corresponding to SR-CONFIG-1 is located on the carrier 1 and the carrier 2 respectively, and a PUCCH resource corresponding to SR-CONFIG-2 is located on the carrier 1 and the carrier 2 respectively. SR-CONFIG-1 and SR-CONFIG-2 have different SR periods.

Correspondingly, the second processing unit is configured to receive the SR configuration configured for each LCH by the network side, the SR configuration including a PUCCH resource for the at least one carrier.

The network configures mapping between the LCH and the SR configuration. The following mapping relationship between the LCH and the SR configuration may be formed respectively based on a mapping relationship between different SR configurations and carriers: the network maps one SR configuration to each LCH, said one SR configuration including PUCCH resources of two carriers, as shown in Table 3.

TABLE 3

| LCH1 | SR-CONFIG-1 |
| LCH2 | SR-CONFIG-2 |
| LCH3 | SR-CONFIG-1 |
| LCH4 | SR-CONFIG-2 |

In the scenario provided in the embodiment, reporting of the SR may further be performed on a terminal device side based on a configuration condition of the network side. No matter which manner is adopted, the following processing manner is adopted when the terminal device reports the SR.

The terminal device may further include a transmission unit 43.

The transmission unit 43 is configured to, when the SR is reported, acquire an LCH on which reporting of the SR is triggered, acquire the at least one SR configuration corresponding to the acquired LCH, select, based on a PUCCH resource corresponding to the at least one SR configuration, a PUCCH resource nearest to a moment when reporting of the SR is triggered, and transmit an SR on the selected PUCCH resource.

Specifically, the terminal device selects the corresponding SR configuration according to the LCH on which reporting of the SR is triggered. For example, if the reporting of the SR is triggered on an LCH1, selection is performed as follows.

For the first manner: an SR corresponding to SR-CONFIG-1-A and SR-CONFIG-2-A may be selected to be selected.

For the second manner: an SR corresponding SR-CONFIG-1 may be selected to be reported.

For the two methods, the terminal device selects a PUCCH resource nearest to a moment when reporting of the SR is triggered to transmit the SR.

Thus it can be seen that, with adoption of the solution, the SR configurations configured for the terminal device by a network and corresponding to different carriers may be received, and the SR configurations are mapped to the LCHs. In such a manner, the terminal device may be ensured to acquire correspondences among the LCHs, the carriers and the SR configurations, so that a corresponding resource may be timely determined during scheduling requesting, and system processing efficiency is improved.

Figure 5:
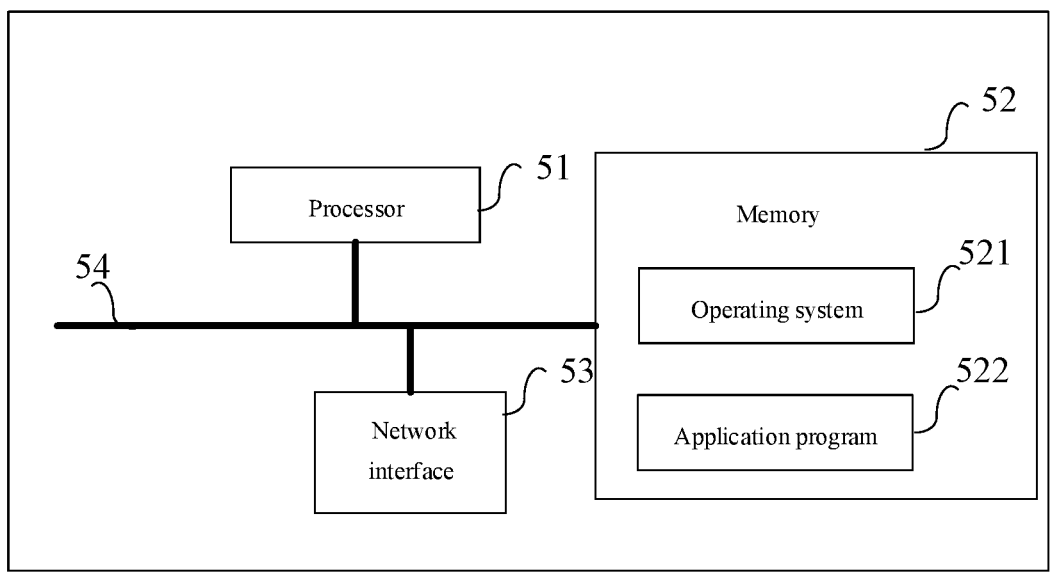
FIG. 5 is a schematic diagram of a hardware architecture according to an embodiment of the application.

The embodiments of the application also provide a hardware composition architecture of a terminal device, which, as shown in FIG. 5, includes at least one processor 51, a memory 52 and at least one network interface 53. Each component is coupled together through a bus system 54. It can be understood that the bus system 54 is configured to implement connection communication between these components. The bus system 54 includes a data bus and further includes a power bus, a control bus and a state signal bus. However, for clear description, various buses in FIG. 5 are marked as the bus system 54.

It can be understood that the memory 52 in the embodiment of the application may be a volatile memory or a nonvolatile memory, or may include both the volatile and nonvolatile memories.

In some implementation modes, the memory 52 stores the following elements, executable modules or data structures, or a subset thereof or an extended set thereof:
an operating system 521 and an application program 522.

Herein, the processor 51 is configured to configure, for each terminal device, an SR configuration corresponding to each of at least one carrier, at least one SR configuration being configured for the same carrier; and configure, for the terminal device, a mapping relationship between each of at least one LCH and the at least one SR configuration.

Specifically, the terminal device may process the steps of the method in the first embodiment and will not be elaborated herein.

The embodiments of the application provide a terminal device, which includes a processor and a memory configured to store a computer program capable of running on the processor.

Herein, the processor is configured to, when the computer program is running on the processor, execute the steps of the method in the second embodiment. No more elaborations will be made herein.

An embodiment of the application provides a computer storage medium having stored thereon computer-executable instructions that, when executed, implement the steps of the method in the first or second embodiment.

When being implemented in form of software functional module and sold or used as an independent product, the device of the embodiments of the application may also be stored in a computer-readable storage medium. Based on such an understanding, the technical solutions of the embodiments of the application substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the application. The storage medium includes: various media capable of storing program codes such as a U disk, a mobile hard disk, a Read Only Memory (ROM), a magnetic disk or an optical disk. As a consequence, the embodiments of the application are not limited to any specific hardware and software combination.

Correspondingly, the embodiments of the application also provide a computer storage medium having stored thereon a computer program, the computer program being configured to execute the data scheduling method of the embodiments of the application.

Although the preferred embodiments of the application have been disclosed for the exemplary purposes, those skilled in the art may realize that it is also possible to make various improvements, additions and replacements. Therefore, the scope of the application should not be limited to the abovementioned embodiments.

The invention claimed is:

1. A method for configuring a Scheduling Request (SR) applied to a network device, the method comprising:
configuring, for a terminal device, an SR configuration corresponding to each of at least one carrier, at least one SR configuration being configured for a same carrier; and
configuring, for the terminal device, a mapping relationship between each of at least one Logical Channel (LCH) and the at least one SR configuration,
wherein configuring, for the terminal device, the SR configuration corresponding to each of the at least one carrier comprises:
configuring different SR configurations for different carriers, different SR configurations with a same SR configuration period being configured for different carriers,
wherein configuring, for the terminal device, the mapping relationship between each of the at least one LCH and the at least one SR configuration comprises:

selecting, for each LCH, SR configurations corresponding to different carriers; and establishing a mapping relationship between each LCH and the selected SR configurations corresponding to different carriers.

2. The method of claim 1, wherein selecting, for each LCH, the SR configurations corresponding to different carriers comprises:

selecting, for each LCH, SR configurations with a same SR configuration period from among the different SR configurations configured for different carriers.

3. A method for configuring a Scheduling Request (SR) applied to a terminal device, the method comprising:

receiving an SR configuration configured by a network side and corresponding to each of at least one carrier, at least one SR configuration being configured for a same carrier; and receiving a mapping relationship configured by the network side and between each of at least one Logical Channel (LCH) and the at least one SR configuration, wherein the method further comprises:

when the terminal device reports the SR, acquiring an LCH on which reporting of the SR is triggered;

acquiring the at least one SR configuration corresponding to the acquired LCH; and selecting, based on a Physical Uplink Control Channel (PUCCH) resource corresponding to the at least one SR configuration, a PUCCH resource nearest to a moment when the reporting of the SR is triggered, and transmitting the SR on the selected PUCCH resource, wherein the mapping relationship between each of the at least one LCH and the at least one SR configuration is configured by:

selecting, for each LCH, SR configurations corresponding to different carriers; and establishing the mapping relationship between each LCH and the selected SR configurations corresponding to different carriers.

4. The method of claim 3, wherein receiving the SR configuration configured by the network side and corresponding to each of the at least one carrier comprises:

receiving different SR configurations configured for different carriers by the network side, different SR configurations with a same SR configuration period being configured for different carriers.

5. The method of claim 4, wherein receiving the mapping relationship configured by the network side and between each of the at least one LCH and the at least one SR configuration comprises:

receiving a mapping relationship configured by the network side and between each LCH and the SR configurations corresponding to different carriers, wherein each LCH is mapped to the SR configurations with the same SR configuration period, which are configured for different carriers.

6. The method of claim 3, wherein receiving the SR configuration configured by the network side and corresponding to each of the at least one carrier comprises:

receiving a same SR configuration configured by the network side for different carriers of the at least one carrier.

7. The method of claim 6, wherein receiving the mapping relationship configured by the network side and between each of the at least one LCH and the at least one SR configuration comprises:

receiving one SR configuration configured for each LCH by the network side, said one SR configuration comprising a PUCCH resource for the at least one carrier.

8. A network device, comprising:

a memory storing processor-executable instructions; and a processor arranged to execute the stored processor-executable instructions to perform operations of:

configuring, for a terminal device, a Scheduling Request (SR) configuration corresponding to each of at least one carrier, at least one SR configuration being configured for a same carrier; and configuring, for the terminal device, a mapping relationship between each of at least one Logical Channel (LCH) and the at least one SR configuration, wherein configuring, for the terminal device, the SR configuration corresponding to each of the at least one carrier comprises:

configuring different SR configurations for different carriers, different SR configurations with a same SR configuration period being configured for different carriers, wherein configuring, for the terminal device, the mapping relationship between each of the at least one LCH and the at least one SR configuration comprises:

selecting, for each LCH, SR configurations corresponding to different carriers; and establishing a mapping relationship between each LCH and the selected SR configurations corresponding to different carriers.

9. The network device of claim 8, wherein configuring, for the terminal device, the mapping relationship between each of the at least one LCH and the at least one SR configuration comprises:

selecting, for each LCH, SR configurations corresponding to different carriers; and establishing a mapping relationship between each LCH and the selected SR configurations corresponding to different carriers.

10. The network device of claim 9, wherein selecting, for each LCH, the SR configurations corresponding to different carriers comprises:

selecting, for each LCH, SR configurations with a same SR configuration period from among the different SR configurations configured for different carriers.

11. A terminal device, comprising:

a memory storing processor-executable instructions; and a processor arranged to execute the stored processor-executable instructions to perform operations of:

receiving a Scheduling Request (SR) configuration configured by a network side and corresponding to each of at least one carrier, at least one SR configuration being configured for a same carrier; and receiving a mapping relationship configured by the network side and between each of at least one Logical Channel (LCH) and the at least one SR configuration, wherein the processor is arranged to execute the stored processor-executable instructions to further perform operations of:

when the SR is reported, acquiring an LCH on which reporting of the SR is triggered;

acquiring the at least one SR configuration corresponding to the acquired LCH; and selecting, based on a Physical Uplink Control Channel (PUCCH) resource corresponding to the at least one SR configuration, a PUCCH resource nearest to a moment when the reporting of the SR is triggered, and transmit the SR on the selected PUCCH resource, wherein configuring, for the terminal device, the mapping relationship between each of the at least one LCH and the at least one SR configuration comprises:

selecting, for each LCH, SR configurations corresponding to different carriers; and establishing a mapping relationship between each LCH and the selected SR configurations corresponding to different carriers.

12. The terminal device of claim 11, wherein receiving the SR configuration configured by the network side and corresponding to each of the at least one carrier comprises:

receiving different SR configurations configured for different carriers by the network side, different SR configurations with a same SR configuration period being configured for different carriers.

13. The terminal device of claim 11, wherein receiving the SR configuration configured by the network side and corresponding to each of the at least one carrier comprises:

receiving a same SR configuration configured by the network side for different carriers of the at least one carrier.

14. The terminal device of claim 13, wherein receiving the mapping relationship configured by the network side and between each of the at least one LCH and the at least one SR configuration comprises:

receiving one SR configuration configured for each LCH by the network side, said one SR configuration comprising a PUCCH resource for the at least one carrier.

* * * * *